United States Patent

[11] 3,550,513

| [72] | Inventors | Bruce K. Johnson<br>Andover;<br>Anthony J. Schettino, Hanson, Mass. |
|------|-----------|--------------------------------------------------------------------|
| [21] | Appl. No. | 757,045 |
| [22] | Filed | Sept. 3, 1968 |
| [45] | Patented | Dec. 29, 1970 |
| [73] | Assignee | Polaroid Corporation<br>Cambridge, Mass.<br>a corporation of Massachusetts |

[54] LOCKING MEANS FOR PUSHBUTTON ACTUATORS
8 Claims, 5 Drawing Figs.

[52] U.S. Cl. .................................................... 95/11,
    95/53; 74/527
[51] Int. Cl. .................................................... G03b 19/00
[50] Field of Search .......................................... 95/53, 11;
    74/527; 292/PBO; 70/181; 280/(Inquired);
    340/(Inquired); 350/(Inquired)

[56] References Cited
UNITED STATES PATENTS

| 2,738,716 | 3/1956 | Faulhaber et al. | 95/53X |
| 2,975,688 | 3/1961 | Harter | 95/11 |
| 3,187,653 | 6/1965 | Rentschler | 95/53 |
| 3,418,904 | 12/1968 | Wick et al. | 95/53X |

*Primary Examiner*—John M. Horan
*Assistant Examiner*—Richard M. Sheer
*Attorneys*—Brown and Mikulka, William D. Roberson and James L. Neal ABSTRACT: A locking arrangement for pushbutton actuators particularly of the type used to actuate exposure control mechanisms of photographic cameras. The pushbutton is provided with a longitudinal resilient finger projecting from one side thereof and engageable in an arcuate track having a pair of spaced detents cooperable with a side surface of the finger. One of the detents is slotted or open to permit depression of the pushbutton from an unlocked position.

PATENTED DEC 29 1970 3,550,513
Fig. 1.
Fig. 2. Fig. 3.
Fig. 4. Fig. 5.
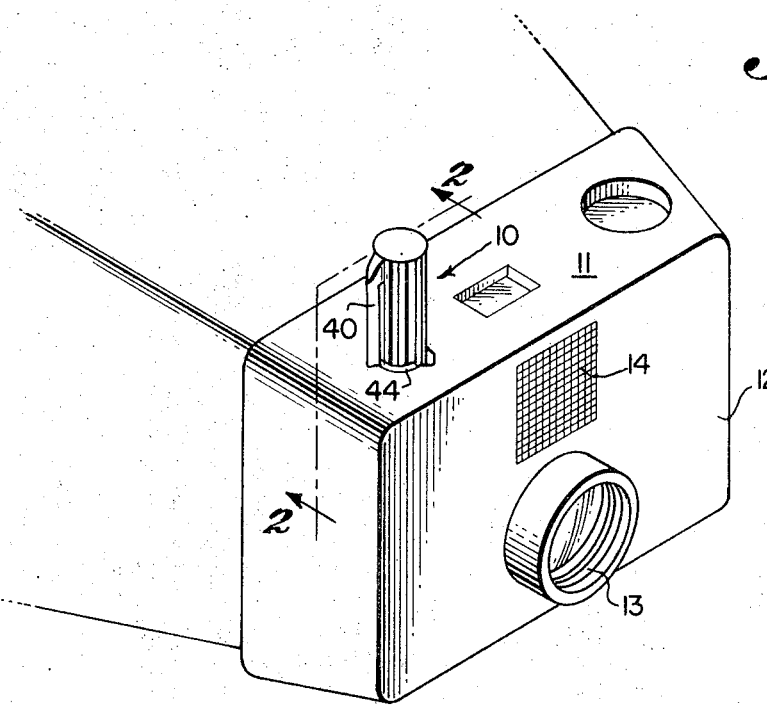
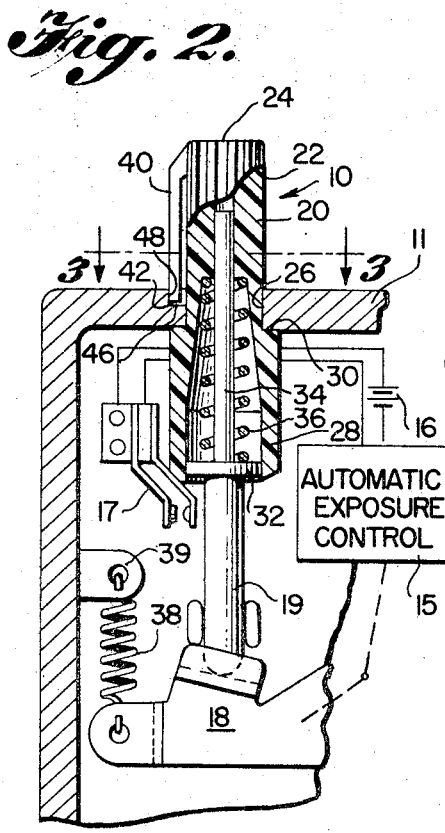
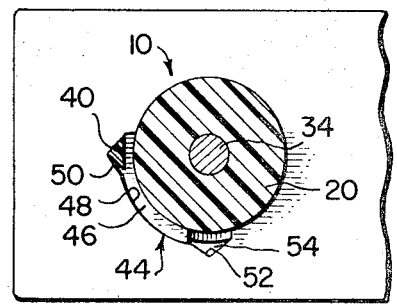
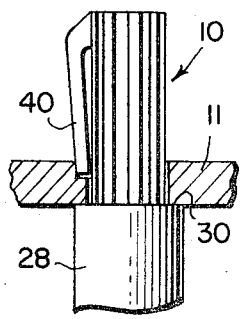
INVENTOR
BRUCE K. JOHNSON &
ANTHONY J. SCHETTINO
BY Brown + Mikulka and
James L. Neal
ATTORNEYS

LOCKING MEANS FOR PUSHBUTTON ACTUATORS

BACKGROUND OF THE INVENTION

This invention relates to an arrangement for locking pushbutton actuators, and more particularly, it concerns a locking feature for pushbutton actuators especially adapted for use as a shutter actuator in a photographic camera.

In the photographic camera art, recent developments have been directed to total automation of the film exposure control apparatus so that the photographer need only direct the camera at the objective and press a button to achieve optimum exposure of the film under the conditions existing at the time. Consequently, cameras are presently available which incorporate various forms of electronic light measuring circuits correlated with mechanical diaphragms and shutter arrangements so that the adjustments of such parameters as size of the lens aperture and shutter speed are adjusted automatically during depression of a manually operated actuator button to actuate the shutter.

An example of a photographic exposure control apparatus of this —type is disclosed in a copending application Ser. No. 673,574 filed Oct. 9, 1967, now U.S. Pat. No. 3,522,765, by Bruce K. Johnson and Otto E. Wolf and assigned to the assignee of the present invention. In the operation of the control apparatus disclosed in that copending application, one manual depression of the shutter-actuating pushbutton operates successively to close a switch to energize a combined light-measuring and shutter-closure-blade retaining solenoid circuit, to cock the shutter mechanism for unblocking the exposure aperture of the camera and ultimately to release the shutter-closing blade for completing the film exposure.

Because of the multiple operating functions performed by the actuator button as it is moved from its normal or extended position to its depressed actuation position, the correlation of actuator button movement to initiation of successive functions requires that the actuator pushbutton be operative over as much as possible of the total distance through which it moves on depression. Hence, the pushbutton is sensitive to slight movements in exposure control systems of this type and requires some measure of care to be exercised by the operator to avoid even partial accidental depression of the actuator pushbutton. To illustrate, initial depressing movement of the actuator button in the apparatus disclosed in the aforementioned copending application operates to close a switch to complete a circuit through a battery power source and a holding solenoid. Since the energization of the solenoid constitutes a drain on the total power available in the battery, it is important to maximum battery life that the switch be closed only during the exposure of photographic film. Moreover, it will be appreciated that where the actuator button is depressed partially for long periods of time such as during storage of the camera in a bag or purse, the camera can be rendered temporarily inoperative due to a rundown battery.

SUMMARY OF THE INVENTION

In accordance with the present invention, an improved locking means is provided for pushbutton actuators, particularly of the type aforementioned, by which the pushbutton may be positively locked against accidental depression by a simple, readily detected, rotational adjustment. Specifically, the exposed body portion of the pushbutton is provided with a downwardly extending resilient finger spaced slightly along its length from the body of the pushbutton and having its lower free end engageable in an arcuate recessed track, the ends of the track restricting rotational movement of the pushbutton and also establishing locked and unlocked positions of the actuator button. Detents are provided in the sidewalls at each end of the track so that the inherent resiliency of the finger, together with its normally spaced relationship to the sides of the actuator button, serve to retain the button in either of the locked or unlocked positions. In the unlocked position, the floor of the track is slotted or apertured so that downward actuating movement of the pushbutton is unimpeded.

Accordingly, among the objects of the present invention are: the provision of a locking feature for a pushbutton actuator which is exceedingly simple in point of structure and yet highly effective in operation; the provision of a pushbutton locking device which is easily manipulated during use; and the provision of a pushbutton actuator locking arrangement in which the locked and unlocked condition of the pushbutton are readily detectable either visably or by touch.

Other objects and further scope of applicability of the present invention will become apparent from the detailed description to follow taken in conjunction with the accompanying drawings.

BRIEF DESCRIPTION OF THE DRAWINGS

FIG. 1 is a fragmentary perspective view illustrating the pushbutton actuator of this invention in its locked position on a camera shutter housing;

FIG. 2 is an enlarged fragmentary cross section taken on line 2–2 of FIG. 1;

FIG. 3 is an enlarged fragmentary cross section taken on line 3–3 of FIG. 2; and FIGS. 4 and 5 are fragmentary side elevations of the pushbutton of this invention in different positions.

DESCRIPTION OF THE PREFERRED EMBODIMENT

In FIGS. 1 and 2 of the drawings, one form of the pushbutton actuator of the present invention is generally designated by the reference numeral 10 and shown mounted on the upper wall 11 of a photographic camera shutter housing 12. The housing conventionally mounts also a camera objective lens 13, a window 14 for a photoresponsive element contained within the housing as part of an automatic exposure control apparatus 15. Since an acceptable form of the automatic exposure control 15 contained within the housing 12 and with which the pushbutton actuator of this invention may be used, is fully disclosed in the aforementioned copending application Ser. No. 673,574 filed Oct. 9, 1967, the details thereof have been omitted from the drawing in the interest of clarity. Illustrated in FIG. 2 of the drawings, however, are the major input components of the automatic exposure control system which, in addition to pushbutton 10, include an electric power source or battery 16, a switch 17, a pivoted capping blade 18 and a force transmitting plunger 19.

As shown most clearly clearly in FIG. 2 of the drawings, the pushbutton actuator 10 includes a generally cylindrical body portion 20 having manually engageable side and end surfaces 22 and 24 respectively. Preferably, the pushbutton is molded from resilient synthetic resinous material though other materials can be used. Also the side surfaces 22 are preferably serrated or knurled as shown. The body portion 20 is supported for rotary and axial movement by a circular aperture 26 extending through the upper wall 11 of the shutter housing 12. An enlarged diameter skirt portion 28 depends within the housing 12 and defines an annular shoulder 30 at its upper end for limiting upward travel of the body portion 20 by engagement with the under surface of the wall 11. The plunger 19 is formed with a guide disc portion 32 slidably received within the lower end of the skirt portion 28 and an upstanding rod portion 34. A compression spring 36 extends between the body portion 20 and the disc 32 to bias the plunger 19 to an extended position relative to the body portion. A tension spring 38 supported between a tab 39 on the shutter housing 12 and the capping blade 18 serves to hold the plunger and the pushbutton 10 in the position shown in FIG. 2 of the drawings. Also the contacts of the switch 19 are positioned to be engaged and closed by the lower end of the skirt 28 upon initial depression of the pushbutton 10.

Although the operating functions of automatic exposure control 15, the capping blade 18 and the switch 17 will not be described, it will be noted that initial downward movement of the pushbutton 10 closes the switch 17 to complete a circuit including the battery 16 and is followed by movement of the plunger 19 and capping blade 18 to effect a film exposing cycle as disclosed in the aforementioned copending application.

To lock the actuator 10 against depression out of its normal extended position as shown, for example, in FIG. 2 of the drawings, a resilient finger 40 is supported in cantilever fashion as a projection from the side of the body portion 20 near the end surface 24. The finger 40 extends downwardly in generally parallel-spaced relation to the side surface 22 of the body portion 20 and terminates with a surface 42 at its lower or free end, the surface 42 thus facing in the direction of actuator depression or oppositely from the end surface 24. Also it will be noted that the lower or free end of the finger 42 is received within an arcuate recessed track 44 contiguous with the aperture 26 in the wall 11 of the camera housing 12, the track 44 thus being defined by a radially or horizontally disposed abutment or floor surface 46 and an axially or vertically disposed camming surface 48.

The track 44 extends through an arc of approximately 90° with respect to the central longitudinal axis of the body portion 20 and has formed at each end thereof in the camming surface 48, detents 50 and 52, respectively. The detents 50 and 52 represent enlargements which permit the resilient finger 40 to assume its normal position spaced from the sides of the body portion 20 when the latter is rotated to position the finger 40 at each of the detents. The portion of the track 44 between the detents 50 and 52 is, however, restricted so as to cam the lower end of the finger 40 inwardly toward the side surface 22 of the body portion when the latter is rotated between the detents 50 and 52 as shown in FIG. 4. Also it will be noted that the floor or abutment surface 46 of the track 44 extends throughout the region of the detent 50 and along the track but terminates in an aperture 54 in the region of the detent 52, the aperture 54 being correspondingly in area to the cross-sectional area of projection represented by the finger 40.

Due to the relative dimensions of the wall 11 in which the track 44 is formed, the depth of the track and the distance between the end face 42 of the finger and the shoulder 30 at the upper end of the skirt 28, the positioning of the lower or free end of the finger 40 in the track 44 is insured. Hence, the ends of the track 44 at which the detents 50 and 52 are located, limit rotation of the pushbutton 10 positively between a "locked" position in which the finger 40 is received in the detent 50 and an "unlocked" position when the finger is received in the detent 52. The positive stops thus effected plus the projecting nature of the finger 40 from the body portion 20 of the pushbutton enables the locked and unlocked positions of the pushbutton to be readily sensed by touch. This characteristic is augmented by locating the locked position at right angles to the optical axis of the camera as shown in FIG. 1 of the drawings and the unlocked position in alignment with the optical axis. From the unlocked position, the pushbutton may be depressed to its actuating position since downward movement of the finger 40 is permitted by the opening 54 as shown in FIG. 5 of the drawings. Also the detents together with the inherent resiliency of the finger 40 serve to retain the push button 10 yieldably in the locked and unlocked positions.

Thus it will be appreciated that by this invention there is provided a highly effective locking arrangement for pushbutton actuators and by which the above mentioned objectives are completely fulfilled. While the actuator thus described has particular utility in photographic cameras, the beneficial attributes of the locking feature of the present invention may be used in other pushbutton environments where inadvertent actuation or depression must be avoided. Also it is contemplated that various modifications and/or changes can be made in the disclosed embodiment of this invention without departure from the true spirit and scope thereof. It is expressly intended, therefore, that the foregoing description is illustrative of a preferred embodiment only, not limiting, and that the true scope of the present invention be determined by reference to the appended claims.

We claim:

1. In a photographic camera having an automatic exposure-control apparatus of the type in which initial depression of a manually operated pushbutton effects closure of switch means to energize an electric circuit including a battery power source, locking means to prevent inadvertent depression of said pushbutton and impose an unnecessary drain on said battery, said locking means comprising: means supporting said pushbutton for rotation about a central axis along which it is depressed for actuation, a manually detectable projection on the side of said pushbutton, said projection having an abutment surface facing in the direction of actuating movement, and recessed track means receiving an end of said projection including said abutment surface, said track means having a floor surface engageable with the abutment surface on said projection to prevent depression of said pushbutton, and stop means at each end thereof to limit rotation of said pushbutton between locked and unlocked positions, said floor surface terminating in an opening to receive said projection when said pushbutton is rotated to said unlocked position.

2. The apparatus recited in claim 1 wherein said projection comprises a resilient finger spaced along its length from the side of said pushbutton and wherein said track has a camming surface extending normally from said floor surface portion, said camming surface having detents to retain said pushbutton yieldably in said locked and unlocked positions.

3. In a photographic camera, a shutter housing having a wall with an opening formed therein and a shutter actuating pushbutton supported rotatably in said opening and movable axially to a depressed actuating position, means to lock pushbutton against inadvertent movement toward said actuating position, said means comprising: a resilient finger mounted on said pushbutton, said finger being spaced along its length from the side of said pushbutton and having a free end surface facing in the direction of said actuating movement, said housing wall having a recessed track formed in the outer surface thereof and contiguous with said opening to establish a radially disposed floor surface underlying the free end surface of said finger and an axially disposed camming surface, means to retain the free end portion of said finger within said track, and stop means at each end of said track to limit rotational movement of said pushbutton and said finger between locked and unlocked positions, said floor surface having an opening therein at the end of said track corresponding to said unlocked position to permit depression of said pushbutton when said finger is aligned with said floor surface opening.

4. The apparatus recited in claim 3 wherein said track camming surfaces formed having detents therein at each end of said track to yieldably retain said pushbutton in said locked and unlocked positions respectively.

5. The apparatus recited in claim 3 wherein said finger projects as a ridge along said push button to facilitate manual detection thereof by touch.

6. The apparatus recited in claim 5 wherein said unlocked position is oriented so that said finger faces along the optical axis of the camera.

7. An actuator assembly comprising: a pushbutton having a body portion with manually engageable side and end surfaces, means supporting said body portion for rotation between locked and unlocked positions and for axial movement between said unlocked position and a depressed actuating position, and yieldable means to retain said body portion in either of said locked or unlocked positions, said yieldable means comprising a resilient finger mounted on said body portion, said finger normally being spaced along its length from the side of said body portion and having a free end surface facing oppositely from said manually engageable end surface on side body portion, and means defining an arcuate track to receive the free end portion of said finger, said track having a radially disposed abutment surface underlying the free end of said finger to prevent axial movement of said body portion and an axially disposed camming surface slidably engageable with said finger near the free end thereof, said camming surface having first and second spaced detents formed therein, and corresponding respectively to said locked and unlocked positions, said abutment surface terminating at an opening in the region of said second detent whereby axial depression of the push button is possibly only upon rotation thereof to position said finger in said second detent.

8. The apparatus recited in claim 7 wherein said track terminates at said detents to provide positive stops to limit rotational movement between said locked and unlocked positions.